United States Patent
Hagiwara (10) Patent No.: US 9,557,541 B2
(45) Date of Patent: Jan. 31, 2017

(54) ZOOM LENS SYSTEM AND PHOTOGRAPHING APPARATUS

(71) Applicant: HANWHA TECHWIN CO., LTD., Changwon-si (KR)

(72) Inventor: Hiroyuki Hagiwara, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 13/705,979

(22) Filed: Dec. 5, 2012

(65) Prior Publication Data
US 2013/0141798 A1 Jun. 6, 2013

(30) Foreign Application Priority Data

Dec. 5, 2011 (JP) .................. 2011-265489
Oct. 23, 2012 (KR) ........... 10-2012-0117907

(51) Int. Cl.
*G02B 15/14* (2006.01)
*G02B 15/173* (2006.01)

(52) U.S. Cl.
CPC ............. *G02B 15/14* (2013.01); *G02B 15/173* (2013.01)

(58) Field of Classification Search
USPC ....................................... 359/687
See application file for complete search history.

(56) References Cited

U.S. PATENT DOCUMENTS 7,835,084 B2  11/2010  Miyazawa
8,238,038 B2   8/2012  Arakawa et al.

FOREIGN PATENT DOCUMENTS

| | | |
|---|---|---|
| JP | 2008310222 A | 12/2008 |
| JP | 2009169264 A | 7/2009 |
| JP | 2010102096 A | 5/2010 |
| JP | 2010139724 A | 6/2010 |
| KR | 1020110041315 A | 4/2011 |

OTHER PUBLICATIONS

Communication dated Aug. 18, 2015 issued by Japanese Intellectual Property Office in counterpart Japanese Application No. 2011-265489.
Communication dated Nov. 24, 2015, issued by Chinese Intellectual Property Office in counterpart Chinese Application No. 201210517431.6.

*Primary Examiner* — Alicia M Harrington
(74) *Attorney, Agent, or Firm* — Sughrue Mion, PLLC

(57) ABSTRACT

A positive-negative-positive-positive four group zoom lens system capable of achieving about 30 times variable magnification, the positive-negative-positive-positive four group zoom lens system including, sequentially from an object side to an image side: a first lens group having positive refractive power; a second lens group having negative refractive power; a third lens group having positive refractive power; and a fourth lens group having positive refractive power, wherein the first lens group includes one negative lens, the second lens group includes one positive lens, the third lens group includes a positive lens, the fourth lens group includes at least one positive lens, and a first condition, $0.03<|f_2/f_t|<0.08$, is satisfied, wherein $f_2$ denotes a focal length of the second lens group and $f_t$ denotes a focal length of the zoom lens system in a telephoto position.

18 Claims, 10 Drawing Sheets

ZOOM LENS SYSTEM AND PHOTOGRAPHING APPARATUS

CROSS-REFERENCE TO RELATED PATENT APPLICATIONS

This application claims priority from Japanese Patent Application No. 2011-265489, filed on Dec. 5, 2011, in the Japan Patent Office, and Korean Patent Application No. 10-2012-0117907, filed on Oct. 13, 2012, in the Korean Intellectual Property Office, the disclosures of which are incorporated herein by reference in their entirety.

BACKGROUND

1. Field

Apparatuses consistent with exemplary embodiments relate to a zoom lens system and a photographing apparatus using the same, and more particularly, to a zoom lens system applicable to a camera such as a surveillance camera, a video camera, a digital still camera, or a broadcasting camera, and a photographing apparatus, not being limited thereto, using the zoom lens system.

2. Description of the Related Art

In the related art, a positive-negative-positive-positive four group zoom lens system is known as an example of a zoom lens system having high image quality and high magnification, and suitable to a surveillance camera, a video camera, a digital still camera, or a broadcasting camera. The positive-negative-positive-positive four group zoom lens system includes a first lens group having positive refractive power, a second lens group having negative refractive power, a third lens group having positive refractive power, and fourth lens group having positive refractive power, sequentially from an object side. During variable magnification (also known as "zooming") from a wide-angle position to a telephoto position, the first and third lens groups are fixed in an optical axis direction, the second lens group move from an object side to an image side, and the fourth lens group moves in the optical axis direction so as to compensate for an image plane change generated as the second lens group move from an object side to an image side while performing a focusing function, i.e., focusing.

Recently, it has been required to obtain an optical performance corresponding to a high pixel photographing apparatus and maintain a satisfactory performance even during short distance focusing. JP 2010-139724 (hereinafter, referred to as "a patent reference 1") discloses a method of distributing positive refractive power by disposing three negative lenses and three positive lenses in a first lens group, as a method of obtaining an optical performance of the telephoto position. Also, JP 2010-102096 (hereinafter, referred to as "a patent reference 2") discloses a positive-negative-positive-positive four group zoom lens system, wherein a second lens group includes at least two negative lenses.

However, the zoom lens systems disclosed in the patent references 1 and 2 do not show optical performances corresponding to a high pixel photographing apparatus while having a small size and variable magnification. For example, in the patent reference 1, only 20 times variable magnification is obtained. Also in the patent reference 1, a high performance is promoted by including a negative lens, a meniscus negative lens, and a cemented lens of a negative lens and a positive lens in a second lens group sequentially from an object side to an image side to distribute negative refractive power, and by compensating for comma aberration generated according to a viewing angle change at the wide-angle position. However, an optical performance is not satisfactory in the patent reference 1 since chromatic aberration is not sufficiently compensated for due to unsuitable location of a positive lens. Also, in the patent reference 2, a zoom lens system having 30 times variable magnification cannot be obtained.

SUMMARY

One or more exemplary embodiments provide a new and improved zoom lens system and an imaging device, which are capable of achieving miniaturization and about 30 times variable magnification in a positive-negative-positive-positive four group zoom lens.

According to an aspect of an exemplary embodiment, there is provided a zoom lens system including, sequentially from an object side to an image side: a first lens group having positive refractive power; a second lens group having negative refractive power; a third lens group having positive refractive power; and a fourth lens group having positive refractive power, wherein the first and third lens groups are fixed in an optical axis direction during variable magnification from a wide-angle position to a telephoto position, the variable magnification is performed as the second lens group moves from the object side to an image side, and the fourth lens group moves in the optical axis direction to compensate for a change of an image plane location according to the movement of the second lens group while performing a focusing function, and the first lens group includes one negative lens, the second lens group includes one positive lens, the third lens group includes a positive lens, the fourth lens group includes at least one positive lens, and a first condition $0.03<|f_2/f_t|<0.08$, is satisfied, wherein $f_2$ denotes a focal length of the second lens group and $f_t$ denotes a focal length of the zoom lens system in a telephoto position.

The first and third lens groups may be fixed in an optical axis direction, the second lens group is configured to move from the object side to the image side, and the fourth lens group is configured to move in the optical axis direction to compensate for the movement of the second lens group during variable magnification from a wide-angle position to the telephoto position.

The first lens group may include the one negative lens and three first group positive lenses sequentially from the object side to the image side, the second lens group may include at least three second group negative lenses and the one positive lens, the third lens group may include the positive lens and a third group cemented lens of a third group positive lens and a third group negative lens sequentially provided from the object side to the image side, the fourth lens group may include the at least one positive lens and at least one negative lens, and a second condition, $5.8<|f_1/f_2|<8.0$, is satisfied, wherein $f_1$ denotes a focal length of the first lens group and $f_2$ denotes a focal length of the second lens group.

The positive lens of the third lens group may have at least one surface having an aspherical surface, a cemented surface of the third group cemented lens may be convex to the object side, and a following condition, $0.15<|f_3/f_t|<0.35$ and $0.4<|f_{31}/f_3|<0.8$, are satisfied, wherein $f_3$ denotes a focal length of the third lens group, $f_{31}$ denotes a focal length of the positive lens in the third lens group closest to the object side, and $f_t$ denotes the focal length of the zoom lens system in the telephoto position.

At least one of the three first group positive lenses in the first lens group may use a glass material having an Abbe number greater than or equal to 80.

The one positive lens in the second lens group may include a convex surface facing the object side, and the second lens group may include, sequentially from the object side to the image side, first and second negative lenses and a second group cemented lens of a positive lens having a convex surface facing the object side and a third negative lens.

The fourth lens group may include a fourth lens cemented lens of a fourth group positive lens and a fourth group negative lens sequentially from the object side to the image side, the fourth group positive lens may have at least one surface having an aspherical surface, and another condition, $0.08<|f_4/f_t|<0.25$, is satisfied, wherein $f_4$ denotes a focal length of the fourth lens group and $f_t$ denotes a focal length of the zoom lens system in a telephoto position.

The zoom lens system of claim 1 may further include an aperture fixed to an image plane disposed between the second lens group and the third lens group.

Principal points of the third lens group may be disposed at the object side of the zoom lens system.

The third lens group may compensate for off-axis aberration generated during the variable magnification by including at least one surface having an aspherical surface shape.

The fourth lens group may compensate for axial aberration generated during the variable magnification by including a cemented lens of a fourth positive lens and a fourth negative lens.

According to another aspect of an exemplary embodiment, there is provided a photographing apparatus including the zoom lens system.

BRIEF DESCRIPTION OF THE DRAWINGS

The above and other features and advantages will become more apparent by describing in detail exemplary embodiments thereof with reference to the attached drawings in which.

DETAILED DESCRIPTION

Hereinafter, one or more exemplary embodiments will be described in detail with reference to accompanying drawings. In drawings, like reference numerals denote like elements to avoid repetition.

Figure 1:
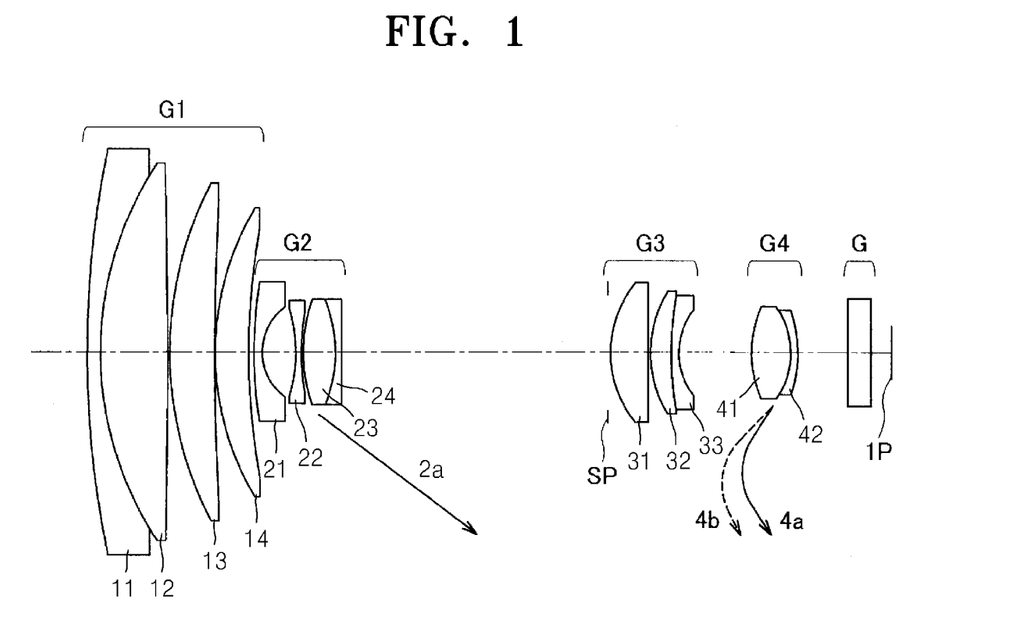
FIG. 1 is a cross-sectional view of lenses at a wide-angle position in Numerical Embodiment 1 according to an exemplary embodiment.
Figure 2:
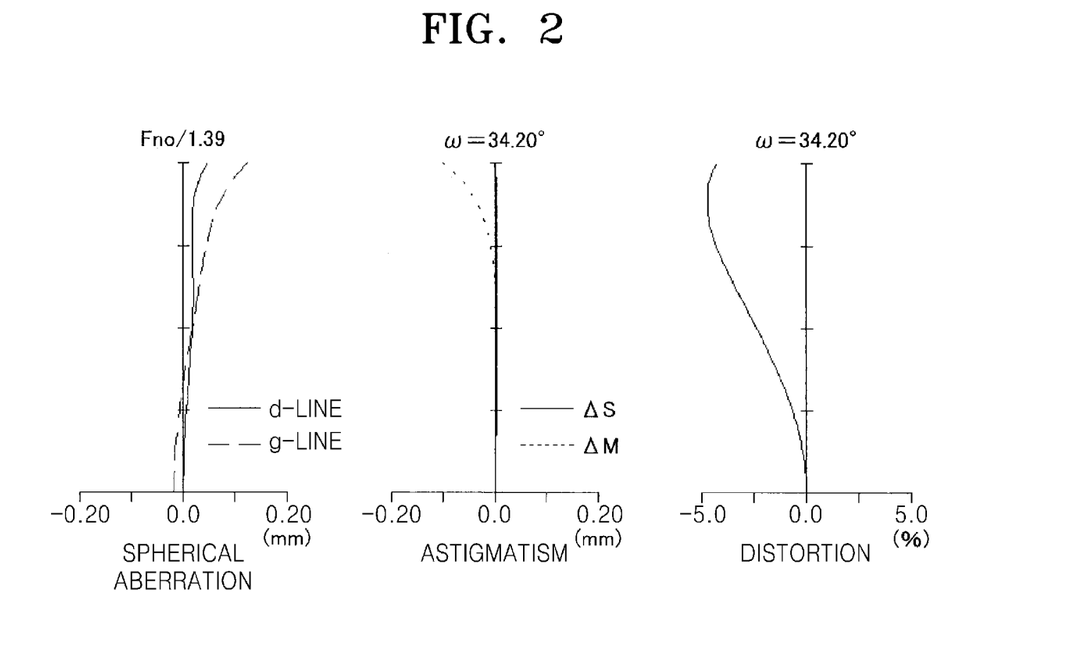
FIG. 2 is an aberration diagram in a wide-angle position in Numerical Embodiment 1 according to an exemplary embodiment.
Figure 3:
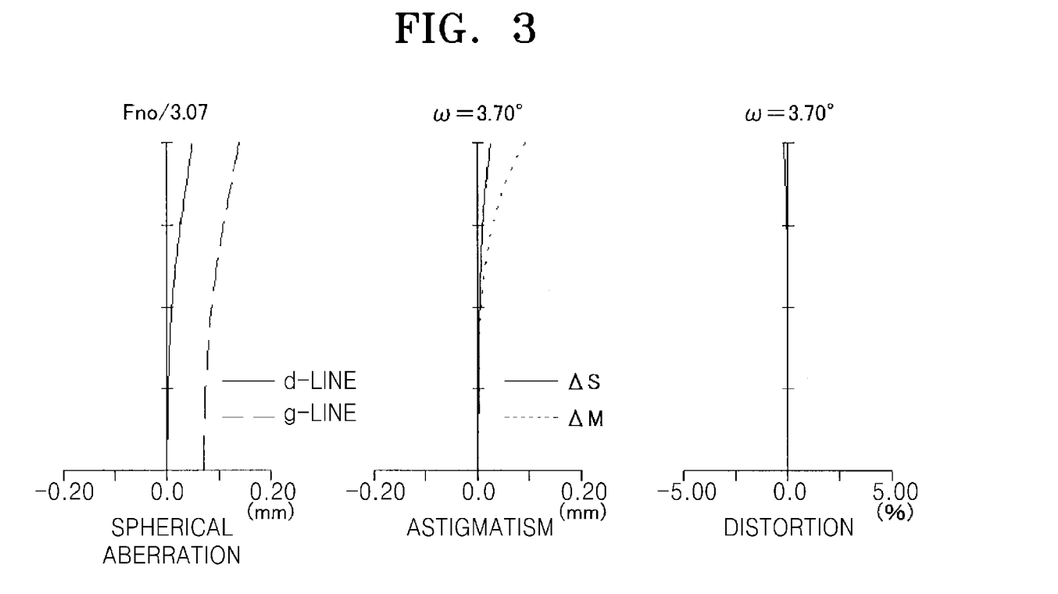
FIG. 3 is an aberration diagram in an intermediate zoom position in Numerical Embodiment 1 according to an exemplary embodiment.
Figure 4:
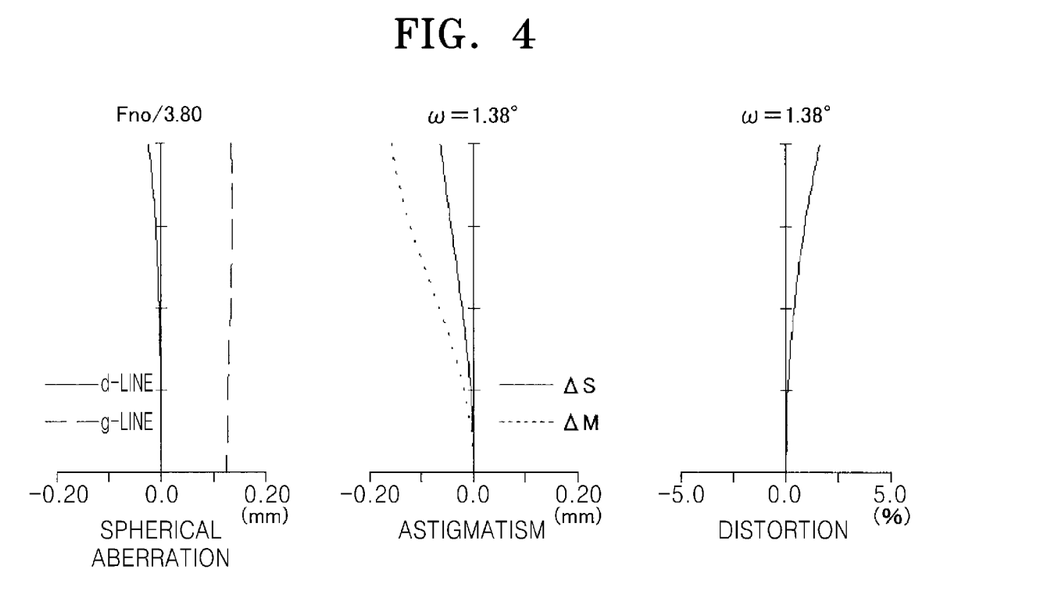
FIG. 4 is an aberration diagram in a telephoto position in Numerical Embodiment 1 according to an embodiment.
Figure 5:
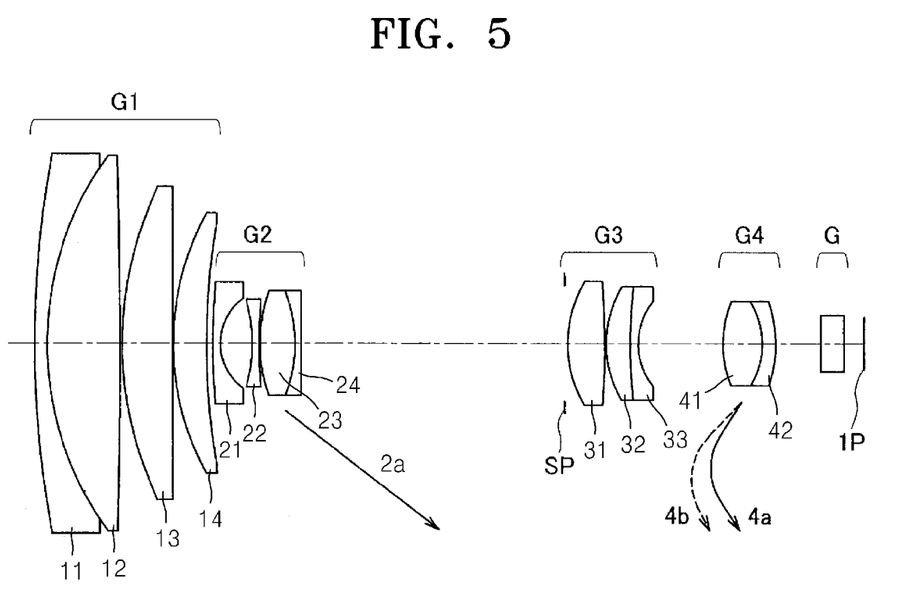
FIG. 5 is a cross-sectional view of lenses at a wide-angle position in Numerical Embodiment 2 according to an exemplary embodiment.
Figure 6:
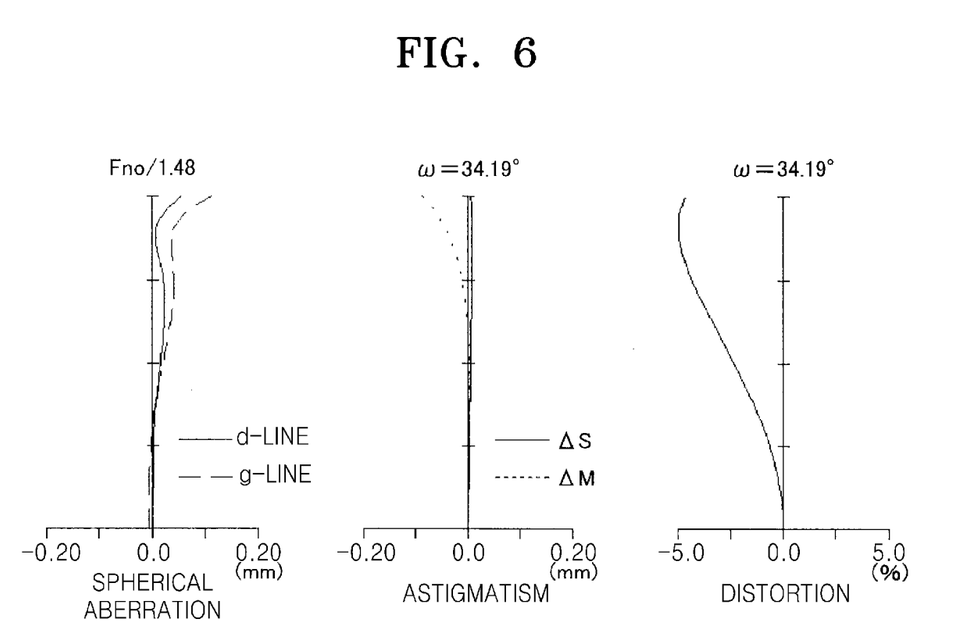
FIG. 6 is an aberration diagram in a wide-angle position in Numerical Embodiment 2 according to an exemplary embodiment.
Figure 7:
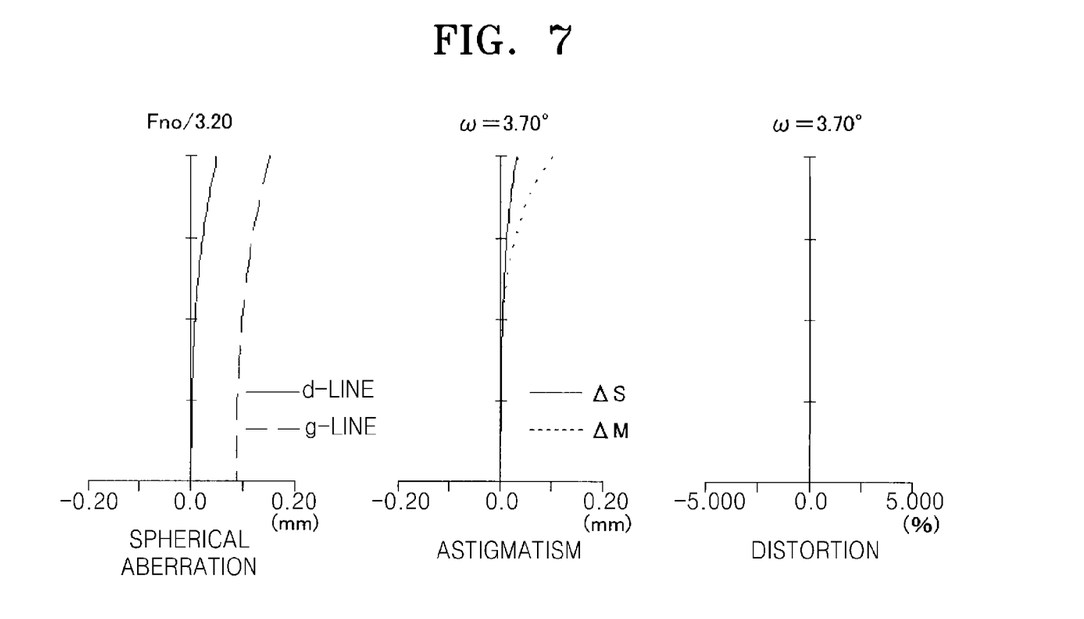
FIG. 7 is an aberration diagram in an intermediate zoom position in Numerical Embodiment 2 according to an exemplary embodiment.
Figure 8:
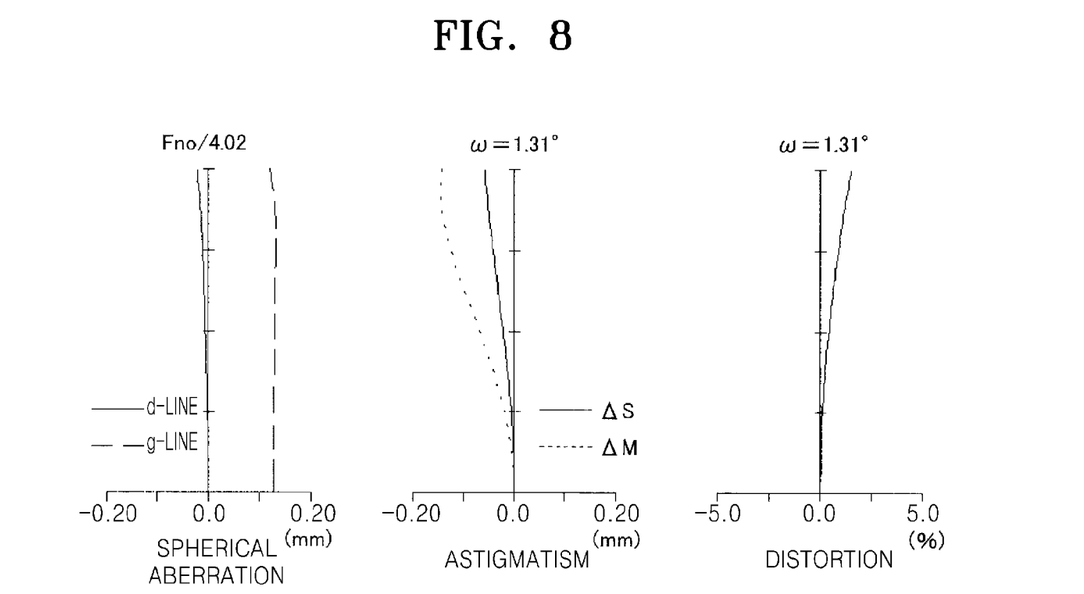
FIG. 8 is an aberration diagram in a telephoto position in Numerical Embodiment 2 according to an exemplary embodiment.
Figure 9:
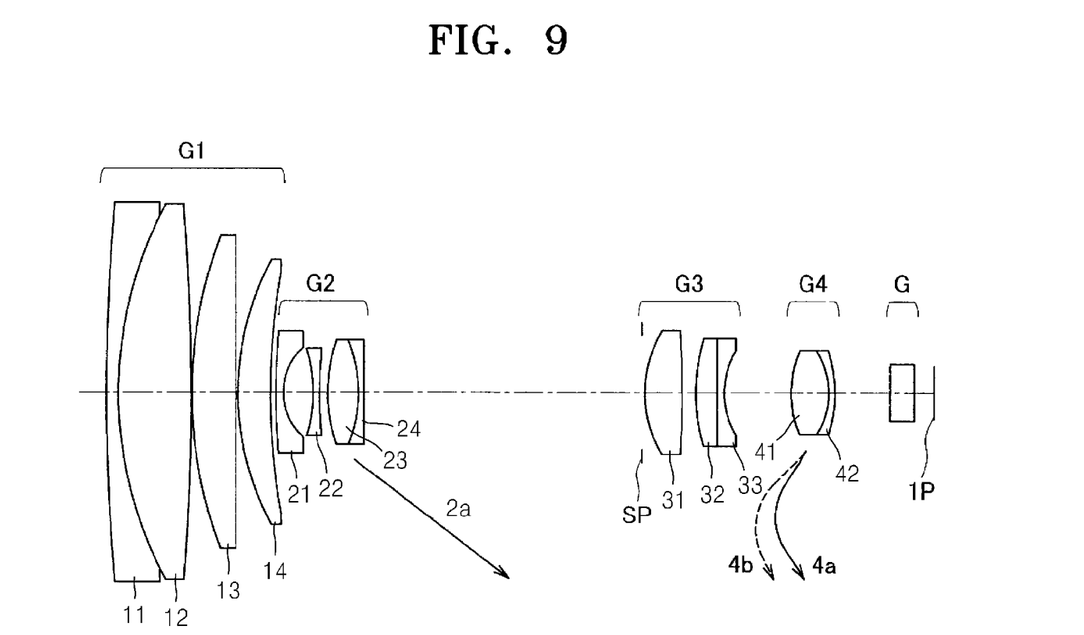
FIG. 9 is a cross-sectional view of lenses at a wide-angle position in Numerical Embodiment 3 according to an exemplary embodiment.
Figure 10:
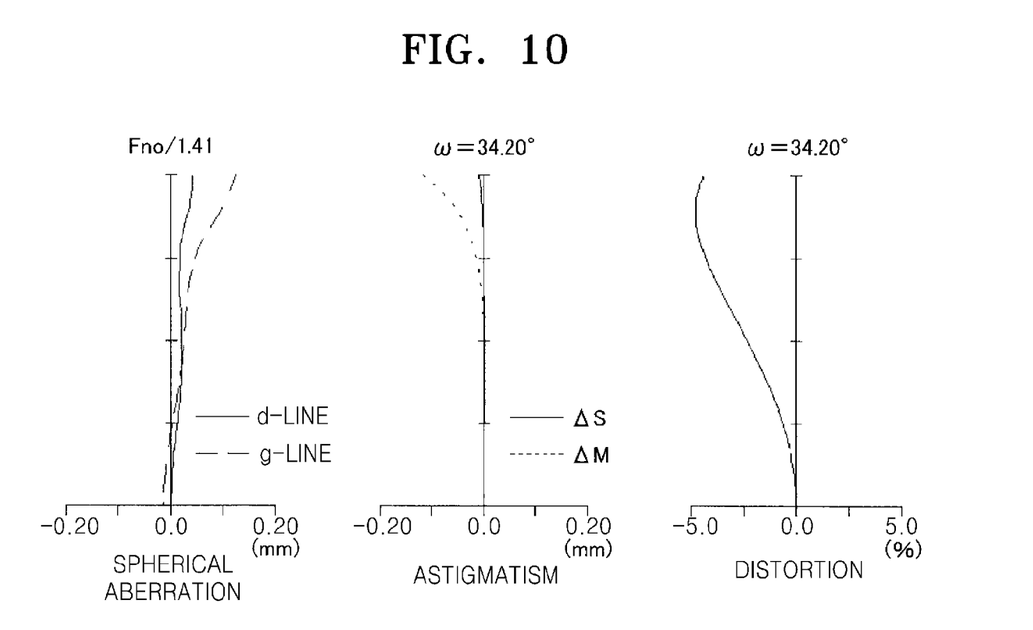
FIG. 10 is an aberration diagram in a wide-angle position in Numerical Embodiment 3 according to an exemplary embodiment.
Figure 11:
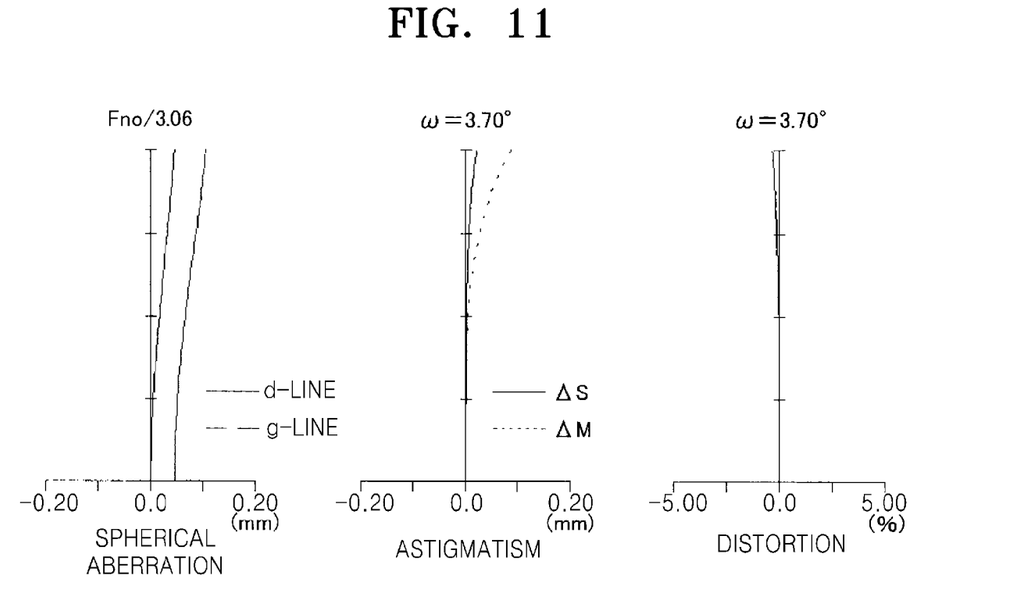
FIG. 11 is an aberration diagram in an intermediate zoom position in Numerical Embodiment 3 according to an embodiment.
Figure 12:
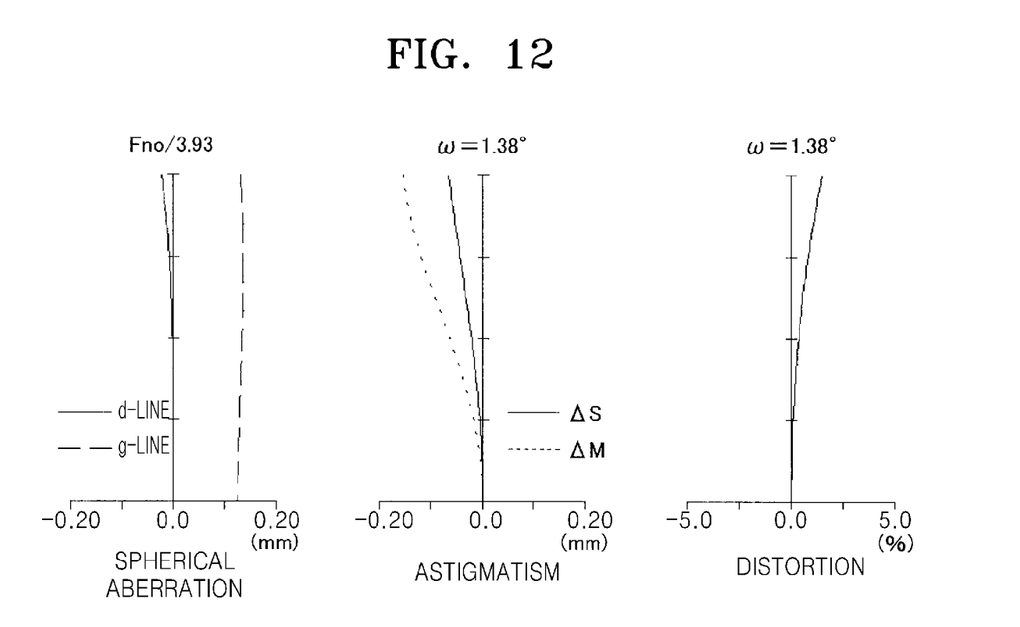
FIG. 12 is an aberration diagram in a telephoto position in Numerical Embodiment 3 according to an exemplary embodiment.
Figure 13:
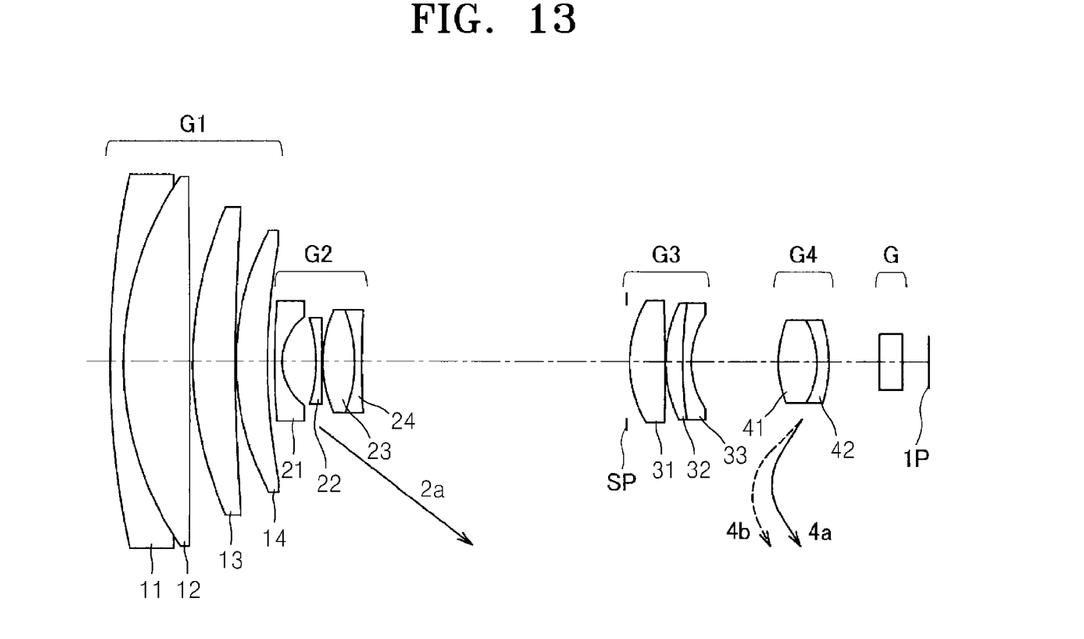
FIG. 13 is a cross-sectional view of lenses at a wide-angle position in Numerical Embodiment 4 according to an exemplary embodiment.
Figure 14:
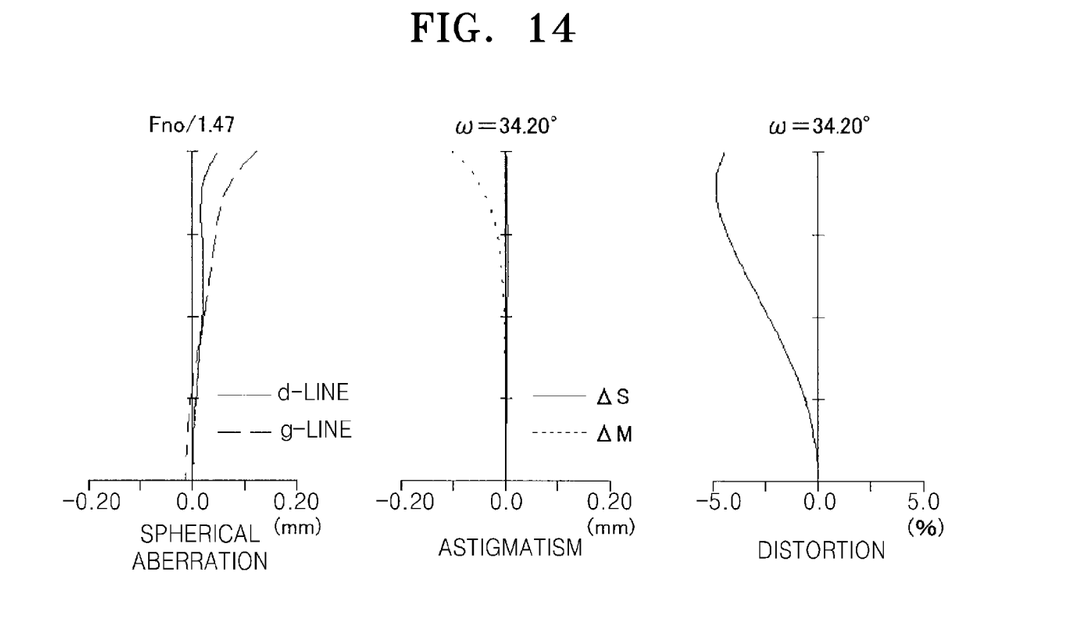
FIG. 14 is an aberration diagram in a wide-angle position in Numerical Embodiment 4 according to an exemplary embodiment.
Figure 15:
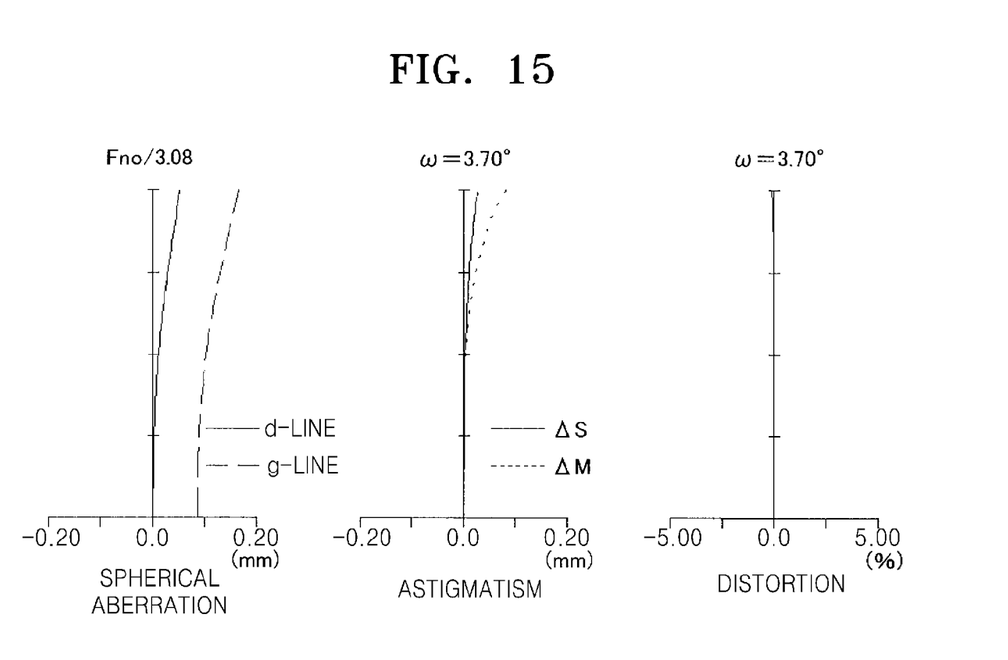
FIG. 15 is an aberration diagram in an intermediate zoom position in Numerical Embodiment 4 according to an exemplary embodiment.
Figure 16:
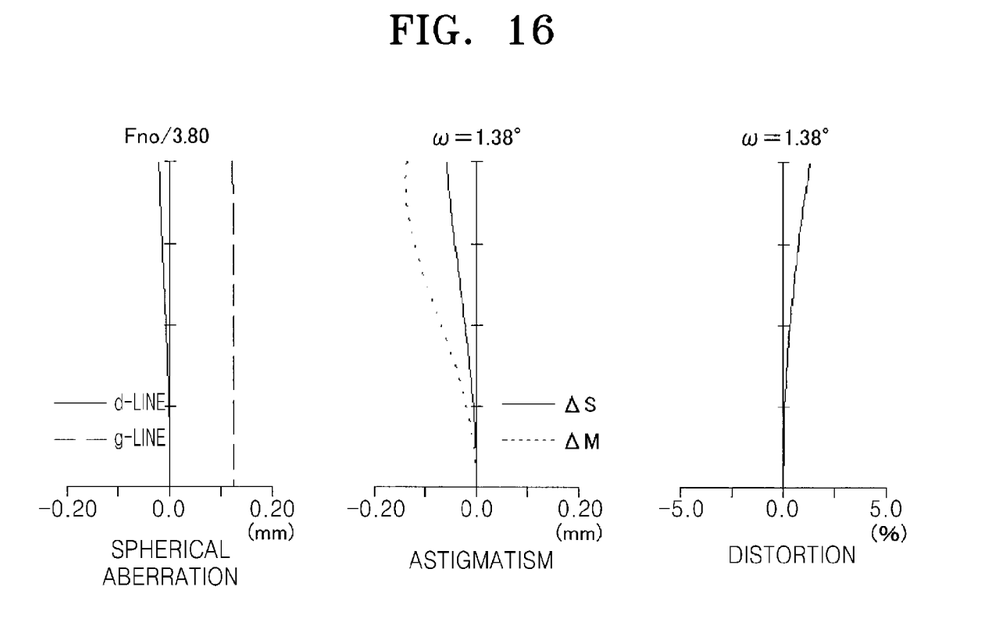
FIG. 16 is an aberration diagram in a telephoto position in Numerical Embodiment 4 according to an exemplary embodiment.
Figure 17:
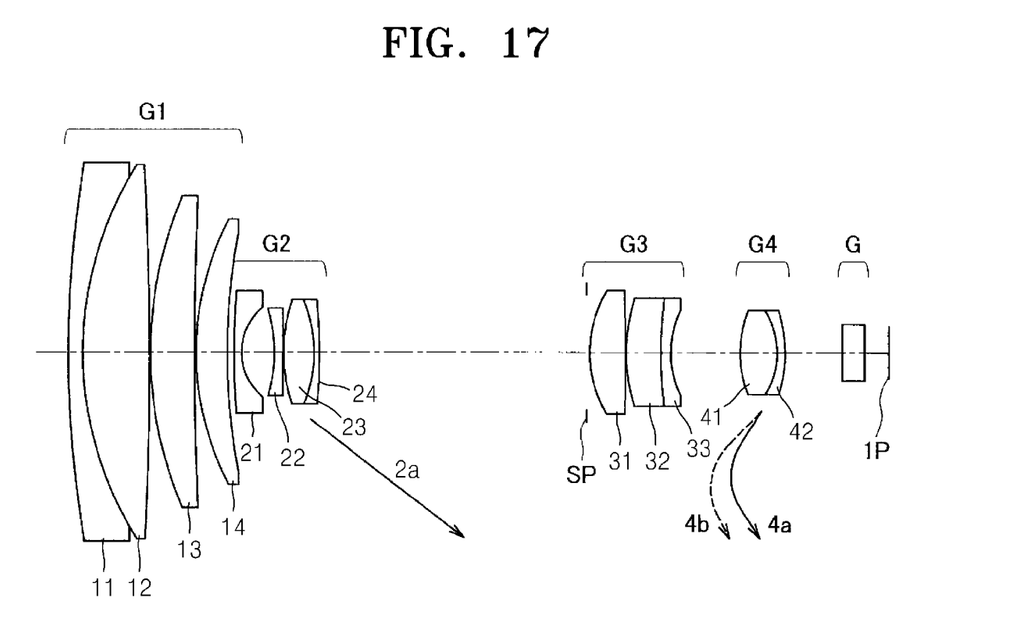
FIG. 17 is a cross-sectional view of lenses at a wide-angle position in Numerical Embodiment 5 according to an exemplary embodiment.
Figure 18:
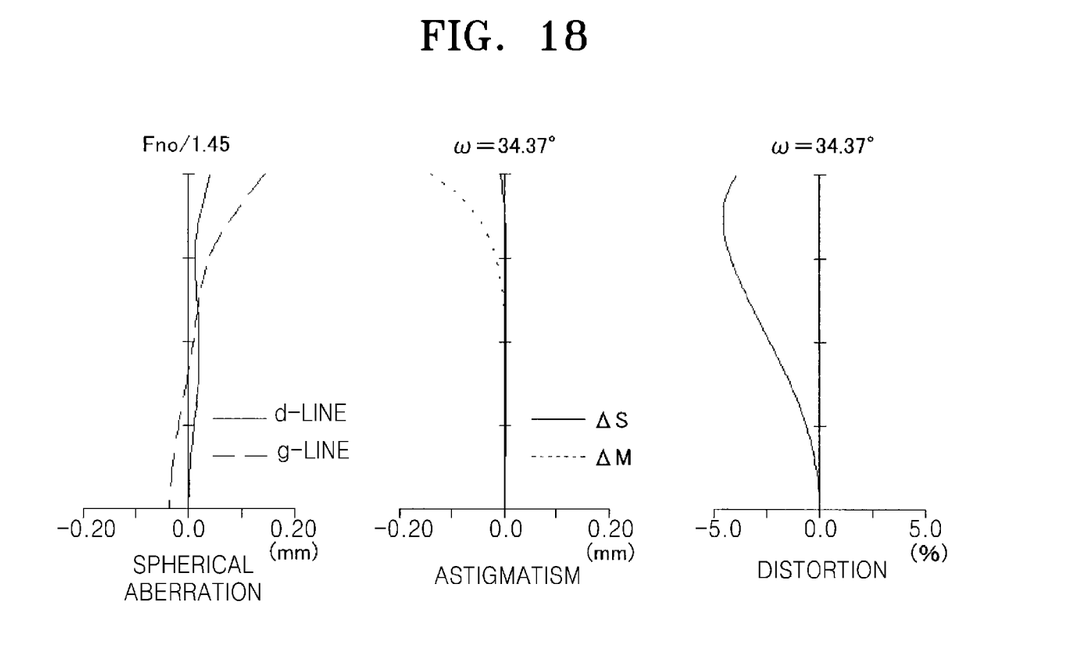
FIG. 18 is an aberration diagram in a wide-angle position in Numerical Embodiment 5 according to an exemplary embodiment.
Figure 19:
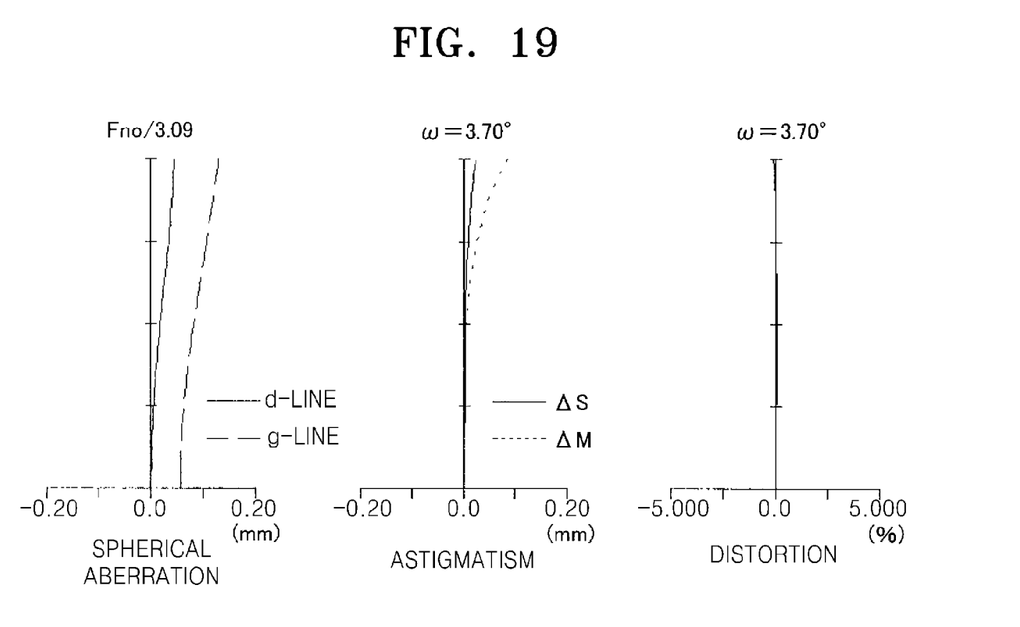
FIG. 19 is an aberration diagram in an intermediate zoom position in Numerical Embodiment 5 according to an exemplary embodiment.
Figure 20:
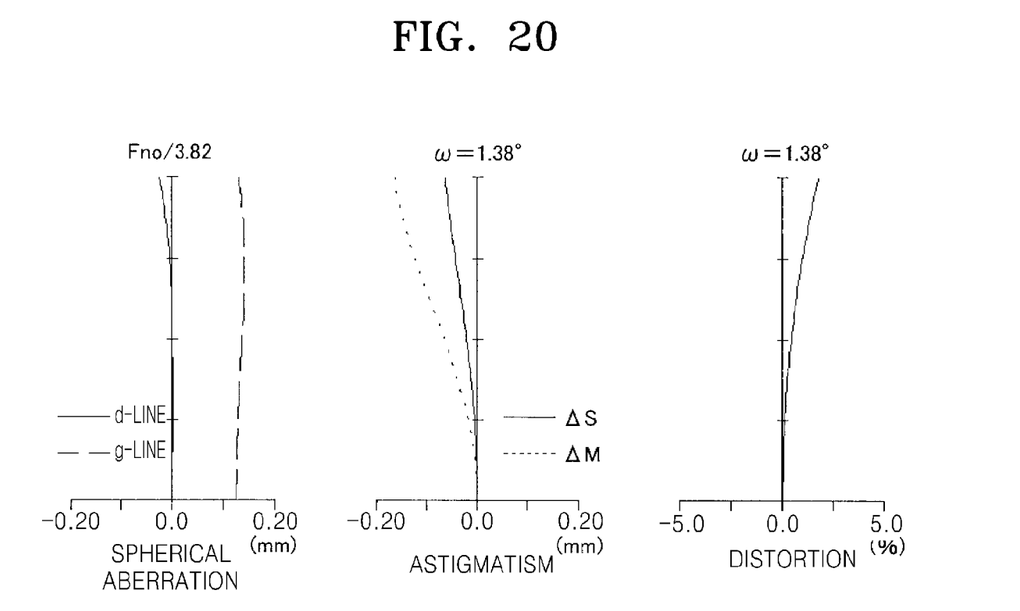
FIG. 20 is an aberration diagram in a telephoto position in Numerical Embodiment 5 according to an exemplary embodiment.

FIG. 1 is a schematic diagram of a zoom lens system according to an exemplary embodiment. A photographing apparatus according to an exemplary embodiment includes the zoom lens system of FIG. 1 and an image pickup device having an image plane on which a subject image is formed by the zoom lens system. FIG. 1 illustrates the zoom lens system with respect to Numerical Embodiment 1 described later. As shown in FIG. 1, the zoom lens system includes a first lens group G1 having positive refractive power, a second lens group G2 having negative refractive power, a third lens group G3 having positive refractive power, and a fourth lens group G4 having positive refractive power sequentially from an object side (left of FIG. 1), wherein an aperture SP is disposed at the third lens group G3 closest to the object side.

In FIG. 1, G denotes an optical block corresponding to an optical filter or a faceplate. IP denotes an image plane which corresponds to an imaging plane of a solid image pickup device (photoelectric conversion device), such as a charge coupled device (CCD) sensor or a complementary metal-oxide semiconductor (CMOS) sensor, when the zoom lens system according to the current exemplary embodiment is used as a photographing optical system of a surveillance camera, a video camera, or a digital still camera, and which corresponds to a film plane when the zoom lens system according to the current exemplary embodiment is used in a silver salts film camera.

The second lens group G2 moves to an image plane side as shown by an arrow 2a during variable magnification from a wide-angle position to a telephoto position. Here, the first and third lens groups G1 and G3 are fixed in an optical axis direction, and the fourth lens group G4 moves to compensate for a change of an image plane location according to the movement of the second lens group G2 while moving to an object side during near-distance focusing. A solid curve 4a and a broken curve 4b of the fourth lens group G4 shown in FIG. 1 show moving trajectories for compensating for an image plane change according to the variable magnification from the wide-angle position to the telephoto position respectively during focusing on an infinite object and a near-distance object.

The first lens group G1 includes a cemented lens of a negative lens 11 having a meniscus shape having a convex surface facing the object side and a positive lens 12 having a convex surface facing the object side, and two positive lenses 13 and 14 having convex surfaces facing the object side. The second lens group G2 includes two negative lenses 21 and 22 and a cemented lens of a positive lens 23 having a convex surface facing the object side and a negative lens 24 sequentially from the object side.

The third lens group G3 includes an independent positive lens 31 having an aspherical surface at the object side, and a cemented lens of a positive lens 32 and a negative lens 33, sequentially from the object side. The fourth lens group G4 includes a cemented lens of a positive lens 41 having an aspherical surface at the object side and a negative lens 42, sequentially from the object side.

The zoom lens system according to the current exemplary embodiment will now be described in detail. The zoom lens system according to the current embodiment includes, sequentially from the object side, the first lens group G1 having positive refractive power, the second lens group G2 having negative refractive power, the aperture SP fixed with respect to the image plane, the third lens group G3 having positive refractive power, and the fourth lens group G4 having positive refractive power, wherein the first and third lens groups G1 and G3 are fixed in the optical axis direction during variable magnification from the wide-angle position to the telephoto position, the variable magnification is performed as the second lens group G2 moves from the object side to an image side, and the fourth lens group G4 moves in the optical axis direction to compensate for the change of the image plane location according to the movement of the second lens group G2 while performing a focusing function. The first lens group G1 includes one negative lens and three positive lenses sequentially from the object side, the second lens group G2 includes at least three negative lenses and one positive lens, the third lens group G3 includes an independent positive lens and a cemented lens of a positive lens and a negative lens sequentially from the object side, the fourth lens group G4 includes at least one of a positive lens and a negative lens, and following conditions are satisfied.

$$0.03 < |f_2/f_t| < 0.08 \quad \text{(Conditional Expression 1)}$$

$$5.8 < |f_1/f_2| < 8.0 \quad \text{(Conditional Expression 2)}$$

Here, $f_1$ denotes a focal length of the first lens group G1, $f_2$ denotes a focal length of the second lens group G2, and $f_t$ denotes a focal length of the zoom lens system in a telephoto position.

Positive refractive power is distributed by disposing at least three positive lenses in the first lens group G1, and specifically, aspherical aberration in the telephoto position is easily compensated for. Also, by using a glass material having an Abbe number greater than or equal to 80 for a positive lens, axial chromatic aberration and lateral chromatic aberration are specifically compensated for in the telephoto position.

By disposing at least three negative lenses and one positive lens in the second lens group G2, negative refractive power is distributed and comma aberration generated according to a change of a viewing angle in the wide-angle position is compensated for, thereby promoting high performance. In detail, by disposing a cemented lens of a positive lens and a negative lens, aberration, such as chromatic aberration, may be satisfactorily compensated for and in addition, an adhesion error during manufacture may be reduced, thereby obtaining stable optical quality.

The third lens group G3 is capable of satisfactorily compensating for off-axis aberration generated during the variable magnification by including at least one surface having an aspherical surface shape. Also, since the third lens group G3 includes two positive lenses and one negative lens, chromatic aberration generated in the third lens group G3 may be satisfactorily compensated for. Moreover, since principal points of the third lens group G3 may be disposed at the object side, a distance from the third lens group G3 to the imaging plane may be reduced, and thus the zoom lens system may be miniaturized. In addition, the negative lens in the third lens group G3 may have a meniscus shape having a high curvature at the image plane side such that spherical aberration is easily compensated for, or/and the negative lens in the third lens group G3 may form a cemented lens with a positive lens such that an interval of principal points with a positive lens of the third lens group G3 nearest to the object may be increased, thereby obtaining a stable optical performance during manufacture.

The fourth lens group G4 may satisfactorily compensate for axial aberration generated during the variable magnification by including a cemented lens of a positive lens and a negative lens. Also, the fourth lens group G4 that is a moving lens group may be light-weighted according to a simplified structure of the fourth lens group G4 via cementing, and may quickly perform a focusing operation. In detail, the fourth lens group G4 may include at least one aspherical surface to easily and satisfactorily compensate for spherical aberration generated in the fourth lens group G4.

The Conditional Expression 1 is an expression defining a focal length of the second lens group G2 and a focal length of the zoom lens system in a telephoto position. If the value of $|f_2/f_t|$ is greater than upper limit of the Conditional Expression 1, refractive power of the second lens group G2 is weakened, a moving amount during variable magnification is increased, and an overall length of zoom lens system is increased and thus it is difficult to miniaturize the zoom lens system. Also, if the value of $|f_2/f_t|$ is lower than lower limit of the Conditional Expression 1, refractive power of the second lens group G2 is strengthened, and it is difficult to satisfactorily compensate for an aberration change during the variable magnification from the wide-angle position state to the telephoto position state.

In detail, a numerical range of the Conditional Expression 1 may be set to satisfy Conditional Expression 1a below.

$$0.05 < |f_2/f_t| < 0.065 \quad \text{(Conditional Expression 1a)}$$

The Conditional Expression 2 is an expression defining a focal length of the first lens group G1 and a focal length of the second lens group G2. If the value $|f_1/f_2|$ is greater than upper limit of the Conditional Expression 2, refractive power of the first lens group G1 is weakened, an overall length of the zoom lens system is increased and moreover, a lens diameter of the first lens group G2 should is increased, and thus it is difficult to miniaturize the zoom lens system. Also, if the value $|f_1/f_2|$ is lower than lower limit of the Conditional Expression 2, refractive power of the first lens group G1 is strengthened and it is difficult to compensate for spherical aberration in a telephoto position and to promote a high performance.

In detail, a numerical range of the Conditional Expression 2 may be set to satisfy Conditional Expression 2a below.

$6.0<|f_1/f_2|<7.0$ (Conditional Expression 2a)

In detail, the third lens group G3 may satisfy following conditions.

$0.15<|f_3/f_t|<0.35$ (Conditional Expression 3)

$0.4<|f_{31}/f_3|<0.8$ (Conditional Expression 4)

Here, $f_3$ denotes a focal length of the third lens group G3, $f_{31}$ denotes a focal length of a positive lens closest to the object side of the third lens group G3, and $f_t$ denotes a focal length of the zoom lens system in a telephoto position.

The Conditional Expression 3 is an expression defining the focal length of the third lens group G3 and the focal length of the zoom lens system in the telephoto position. If $|f_3/f_t|$ is greater than an upper limit of the Conditional Expression 3, refractive power of the third lens group G3 is weakened, and in order to maintain refractive power in the entire third and fourth lens groups G3 and G4, refractive power of the fourth lens group G4 needs to be strengthened. Accordingly, it is difficult to satisfactorily compensate for aberration, such as astigmatism or comma aberration. If $|f_3/f_t|$ is lower than a lower limit of the Conditional Expression 3, refractive power of the third lens group G3 is too strengthened, and thus aberration, such as spherical aberration, is increased.

In detail, a numerical range of the Conditional Expression 3 may be set to satisfy Conditional Expression 3a below.

$0.2<|f_3/f_t|<0.3$ (Conditional Expression 3a)

The Conditional Expression 4 is an expression defining the focal length of the positive lens of the third lens group G3 closest to the object side and the focal length of the third lens group G3. If $|f_{31}/f_3|$ is greater than an upper limit of the Conditional Expression 4, refractive power of the positive lens closest to the object side in the third lens group G3 is too weakened and an overall length of the zoom lens system is lengthened. If $|f_{31}/f_3|$ is lower than a lower limit of the Conditional Expression 4, refractive power of the positive lens closest to the object side in the third lens group G3 is too strengthened and aberration, such as spherical aberration, is increased.

In detail, a numerical range of the Conditional Expression 4 may be set to satisfy Conditional Expression 4a below.

$0.55<|f_{31}/f_3|<0.7$ (Conditional Expression 4a)

In detail, the fourth lens group G4 may satisfy a following condition.

$0.08<|f_4/f_t|<0.25$ (Conditional Expression 5)

Here, $f_4$ denotes a focal length of the fourth lens group G4 and $f_t$ denotes a focal length of the zoom lens system in a telephoto position.

The Conditional Expression 5 is an expression defining the focal length of the fourth lens group G4 and the focal length of the zoom lens system in the telephoto position. If $|f_4/f_t|$ is greater than an upper limit of the Conditional Expression 5, refractive power of the fourth lens group G4 is weakened, it is difficult to miniaturize the zoom lens system because a moving distance (i.e., a moving range of the fourth lens group G4 to the object side or the image side) during focusing of the fourth lens group G4 is increased and it is difficult to reduce an interval between the third lens group G3 and the fourth lens group G4. If $|f_4/f_t|$ is lower than a lower limit of the Conditional Expression 5, refractive power of the fourth lens group G4 is strengthened, and, it is difficult to satisfactorily compensate for an aberration change during variable magnification from a wide-angle position state to a telephoto position state.

In detail, a numerical range of the Conditional Expression 5 may be set to satisfy Conditional Expression 5a below.

$0.1<|f_4/f_t|<0.16$ (Conditional Expression 5a)

As described above, by suitably arranging the first through fourth lens groups G1 through G4, the zoom lens system according to the current exemplary embodiment may have about 30 times variable magnification, maintain an optical performance corresponding to a high pixel image pickup device, and be miniaturized.

According to the current exemplary embodiment, the zoom lens system that has about 30 times variable magnification, is small, and maintains a satisfactory optical performance corresponding to a high pixel image pickup device from a wide-angle position to a telephoto position and from a near-distance to an infinity may be obtained in an image device, such as a surveillance camera, a video camera, or a digital still camera.

Examples of the current exemplary embodiment will now be described in detail. Numerical Embodiments 1 through 5 below are detailed examples suitable to the Conditional Expressions 1 through 5 above. In each of Numerical Embodiments 1 through 5, a surface number i denotes an order of an optical surface from the object side. In each of Numerical Embodiments 1 through 5, $r_i$ denotes a curvature of an (i)th optical surface, $d_i$ denotes a surface interval between the (i)th optical surface and an (i+1)th optical surface, and $nd_i$ and $v\ d_i$ respectively denote a refractive index and an Abbe number of a material of an (i)th optical member with respect to a d-line. A back focus BF is a distance from a lens surface of a lens closest to the object to an image plane. An overall length is obtained by adding BF to a distance from a center of a lens surface of a lens closest to the object to a center of a lens surface of a lens closest to the image plane. Also, a unit of length is in mm.

An aspherical surface may be represented by Equation 1 below when K denotes a conic constant, A4, A6, A8, and A10 denote aspherical surface coefficients, and x denotes a displacement in an optical axis direction at a location of height H from an optical axis based on a surface vertex.

$$X = \frac{(1/R)H^2}{1+\sqrt{1-(1+K)(H/R)^2}} + \qquad \text{[Equation 1]}$$

$$A4H^4 + A6H^6 + A8H^8 + A10H^{10}$$

Here, R denotes a radius of curvature. Also, for example, "E-Z" denotes "10-Z". f denotes a focal length, $F_{no}$ denotes a F-number, and ω denotes a half viewing angle.

Embodiment 1

TABLE 1

[Numerical Embodiment 1]
Surface Data

| Surface No. | r | d | nd | vd |
|---|---|---|---|---|
| Object Surface | ∞ | ∞ | | |
| 1 | 102.782 | 1.400 | 1.80000 | 29.84 |
| 2 | 35.245 | 7.210 | 1.49700 | 81.61 |
| 3 | −699.798 | 0.200 | | |
| 4 | 37.959 | 4.740 | 1.49700 | 81.61 |
| 5 | 295.265 | 0.150 | | |
| 6 | 29.581 | 3.430 | 1.69680 | 55.46 |
| 7 | 75.598 | Variable | | |
| 8 | 56.892 | 0.800 | 1.88300 | 40.81 |
| 9 | 6.049 | 3.554 | | |
| 10 | −15.022 | 0.600 | 1.88300 | 40.81 |
| 11 | 32.341 | 0.150 | | |
| 12 | 15.789 | 3.400 | 1.84666 | 23.78 |
| 13 | −15.789 | 0.600 | 1.77250 | 49.62 |
| 14 | 656.588 | Variable | | |
| 15 (aperture) | ∞ | 0.350 | | |
| 16* | 10.655 | 3.940 | 1.68997 | 53.00 |
| 17 | −531.095 | 0.255 | | |
| 18 | 12.414 | 2.130 | 1.58913 | 61.25 |
| 19 | 32.968 | 0.880 | 1.80000 | 29.84 |
| 20 | 7.507 | Variable | | |
| 21* | 11.243 | 4.050 | 1.58913 | 61.00 |
| 22 | −8.233 | 0.65 | 1.84666 | 23.78 |
| 23 | −14.994 | Variable | | |
| 24 | ∞ | 2.410 | 1.51633 | 64.14 |
| 25 | ∞ | 2.200 | | |
| Image Surface | ∞ | | | |

TABLE 2

Aspherical Surface Data

16th Surface

K = 0   A4 = −9.45E−05   A6 = −1.93E−07   A8 = −6.11E−09   A10 = −4.40E−12

21nd Surface

K = 0   A4 = −8.93E−05   A6 = −2.22E−06   A8 = 1.72E−07   A10 = −3.74E−09

Various Data
Zoom Ratio 28.27

| | Wide-angle | Intermediate | Telephoto |
|---|---|---|---|
| Focal Length | 3.605 | 37.849 | 101.914 |
| F-number | 1.39 | 3.07 | 3.80 |
| Half Viewing Angle (°) | 34.20 | 3.70 | 1.38 |
| Image Height | 2.45 | 2.45 | 2.45 |
| Overall Length | 85.000 | 85.000 | 85.000 |
| BF | 9.131 | 13.751 | 5.076 |
| d7 | 0.650 | 23.028 | 26.956 |
| d14 | 28.160 | 5.782 | 1.855 |
| d21 | 7.719 | 3.093 | 11.795 |
| d24 | 5.371 | 9.998 | 1.296 |

Embodiment 2

TABLE 3

[Numerical Embodiment 2]
Surface Data

| Surface No. | R | d | nd | vd |
|---|---|---|---|---|
| Object Surface | ∞ | ∞ | | |
| 1 | 108.833 | 1.400 | 1.85026 | 32.27 |
| 2 | 33.577 | 7.650 | 1.49700 | 81.61 |
| 3 | −582.215 | 0.200 | | |
| 4 | 37.095 | 5.290 | 1.49700 | 81.61 |
| 5 | 1351.762 | 0.150 | | |
| 6 | 29.910 | 3.480 | 1.69680 | 55.53 |
| 7 | 80.856 | Variable | | |
| 8 | 69.483 | 0.800 | 1.88300 | 40.81 |
| 9 | 5.997 | 3.451 | | |
| 10 | −15.925 | 0.600 | 1.88300 | 40.81 |
| 11 | 32.370 | 0.150 | | |
| 12 | 14.789 | 3.610 | 1.84666 | 23.78 |
| 13 | −14.789 | 0.600 | 1.77250 | 49.62 |
| 14 | 74.980 | Variable | | |
| 15 (aperture) | ∞ | 0.350 | | |
| 16* | 11.774 | 3.950 | 1.68997 | 53.00 |
| 17 | −87.302 | 0.150 | | |
| 18 | 11.855 | 2.550 | 1.58913 | 61.25 |
| 19 | 50.292 | 0.880 | 1.80000 | 29.84 |
| 20 | 7.736 | Variable | | |
| 21* | 11.911 | 4.200 | 1.58913 | 61.00 |
| 22 | −8.462 | 1.44 | 1.84666 | 23.78 |
| 23 | −15.484 | Variable | | |
| 24 | ∞ | 2.410 | 1.51633 | 64.14 |
| 25 | ∞ | 2.200 | | |
| Image Surface | ∞ | | | |

TABLE 4

Aspherical Surface Data

16th Surface

K = 0   A4 = −7.79E−05   A6 = −5.03E−07   A8 = 9.02E−09   A10 = −1.30E−10

21nd Surface

K = 0   A4 = −8.57E−05   A6 = 1.28E−07   A8 = −2.94E−08   A10 = 1.57E−09

Various Data
Zoom Ratio 29.78

|  | Wide-angle | Intermediate | Telephoto |
| --- | --- | --- | --- |
| Focal Length | 3.606 | 37.848 | 107.395 |
| F-number | 1.48 | 3.20 | 4.02 |
| Half Viewing Angle (°) | 34.19 | 3.70 | 1.31 |
| Image Height | 2.45 | 2.45 | 2.45 |
| Overall Length | 88.000 | 88.000 | 88.000 |
| BF | 8.451 | 14.372 | 5.077 |
| d7 | 0.650 | 22.918 | 26.969 |
| d14 | 28.148 | 5.880 | 1.889 |
| d21 | 9.005 | 3.078 | 12.395 |
| d24 | 4.685 | 10.613 | 1.296 |

Embodiment 3

TABLE 5

[Numerical Embodiment 3]
Surface Data

| Surface No. | r | d | nd | vd |
| --- | --- | --- | --- | --- |
| Object Surface | ∞ | ∞ | | |
| 1 | 172.960 | 1.400 | 1.80000 | 29.84 |
| 2 | 41.257 | 7.570 | 1.49700 | 81.61 |
| 3 | −271.118 | 0.200 | | |
| 4 | 44.556 | 4.690 | 1.49700 | 81.61 |
| 5 | −1138.700 | 0.150 | | |
| 6 | 28.439 | 3.340 | 1.69680 | 55.46 |
| 7 | 64.000 | Variable | | |
| 8 | 54.584 | 0.800 | 1.88300 | 40.81 |
| 9 | 6.531 | 3.167 | | |
| 10 | −17.954 | 0.600 | 1.88300 | 40.81 |
| 11 | 26.323 | 1.133 | | |

TABLE 5-continued

[Numerical Embodiment 3]
Surface Data

| Surface No. | r | d | nd | vd |
| --- | --- | --- | --- | --- |
| 12 | 18.640 | 2.940 | 1.84666 | 23.78 |
| 13 | −18.640 | 0.600 | 1.77250 | 49.62 |
| 14 | 700.000 | Variable | | |
| 15 (aperture) | ∞ | 0.350 | | |
| 16* | 11.580 | 3.960 | 1.68997 | 53.00 |
| 17 | −78.580 | 1.307 | | |
| 18 | 19.911 | 2.240 | 1.58913 | 61.25 |
| 19 | 230.800 | 0.880 | 1.80000 | 29.84 |
| 20 | 8.985 | Variable | | |
| 21* | 11.393 | 4.020 | 1.58913 | 61.00 |
| 22 | −8.193 | 0.65 | 1.84666 | 23.78 |
| 23 | −14.023 | Variable | | |
| 24 | ∞ | 2.410 | 1.51633 | 64.14 |
| 25 | ∞ | 2.200 | | |
| Image Surface | ∞ | | | |

TABLE 6

Aspherical Surface Data

16th Surface

K = 0   A4 = −9.44E−05   A6 = 2.43E−07   A8 = −1.71E−08   A10 = 1.35E−10

21nd Surface

K = 0   A4 = −1.11E−04   A6 = −1.56E−06   A8 = 1.03E−07   A10 = −2.26E−09

Various Data
Zoom Ratio 28.27

|  | Wide-angle | Intermediate | Telephoto |
| --- | --- | --- | --- |
| Focal Length | 3.605 | 37.870 | 101.900 |
| F-number | 1.41 | 3.06 | 3.93 |
| Half Viewing Angle (°) | 34.20 | 3.70 | 1.38 |
| Image Height | 2.45 | 2.45 | 2.45 |
| Overall Length | 88.000 | 88.000 | 88.000 |
| BF | 9.601 | 13.391 | 5.077 |
| d7 | 0.650 | 24.705 | 28.649 |
| d14 | 29.875 | 5.821 | 1.876 |
| d21 | 7.026 | 3.226 | 11.567 |
| d24 | 5.841 | 9.641 | 1.300 |

Embodiment 4

TABLE 7

[Numerical Embodiment 4]
Surface Data

| Surface No. | r | d | nd | vd |
|---|---|---|---|---|
| Object Surface | ∞ | ∞ | | |
| 1 | 100.456 | 1.400 | 1.80000 | 29.84 |
| 2 | 34.990 | 7.270 | 1.49700 | 81.61 |
| 3 | −688.313 | 0.200 | | |
| 4 | 38.585 | 4.500 | 1.49700 | 81.61 |
| 5 | 229.880 | 0.150 | | |
| 6 | 30.028 | 3.500 | 1.69680 | 55.46 |
| 7 | 82.507 | Variable | | |
| 8 | 57.351 | 0.800 | 1.88300 | 40.81 |
| 9 | 6.026 | 3.711 | | |
| 10 | −15.163 | 0.600 | 1.88300 | 40.81 |
| 11 | 62.603 | 0.150 | | |
| 12 | 15.230 | 3.520 | 1.84666 | 23.78 |
| 13 | −15.230 | 0.600 | 1.77250 | 49.62 |
| 14 | 40.337 | Variable | | |
| 15 (aperture) | ∞ | 0.350 | | |
| 16* | 11.975 | 3.790 | 1.68997 | 53.00 |
| 17 | −88.107 | 0.150 | | |
| 18 | 14.110 | 1.830 | 1.58913 | 61.25 |
| 19 | 34.296 | 0.880 | 1.80000 | 29.84 |
| 20 | 8.931 | Variable | | |
| 21* | 13.882 | 4.200 | 1.58913 | 61.00 |
| 22 | −8.093 | 1.22 | 1.84666 | 23.78 |
| 23 | −14.623 | Variable | | |
| 24 | ∞ | 2.410 | 1.51633 | 64.14 |
| 25 | ∞ | 2.811 | | |
| Image Surface | ∞ | | | |

Embodiment 5

Example 9

[Numerical Embodiment 5]
Surface Data

| Surface No. | r | d | nd | vd |
|---|---|---|---|---|
| Object Surface | ∞ | ∞ | | |
| 1 | 126.358 | 1.400 | 1.80000 | 29.84 |
| 2 | 37.513 | 7.150 | 1.49700 | 81.61 |
| 3 | −297.156 | 0.200 | | |
| 4 | 39.760 | 4.540 | 1.49700 | 81.61 |
| 5 | 313.113 | 0.150 | | |
| 6 | 29.730 | 3.450 | 1.69680 | 55.46 |
| 7 | 77.263 | Variable | | |
| 8 | 55.345 | 0.800 | 1.88300 | 40.81 |
| 9 | 6.329 | 3.495 | | |
| 10 | −15.344 | 0.600 | 1.88300 | 40.81 |
| 11 | 27.080 | 0.444 | | |
| 12 | 16.960 | 3.190 | 1.84666 | 23.78 |
| 13 | −16.960 | 0.600 | 1.77250 | 49.62 |
| 14 | −280.185 | Variable | | |
| 15 (aperture) | ∞ | 0.350 | | |
| 16* | 11.688 | 3.660 | 1.68997 | 53.00 |
| 17 | −408.920 | 0.150 | | |
| 18 | 18.522 | 3.780 | 1.51633 | 64.14 |
| 19 | 39.174 | 1.040 | 1.90366 | 31.32 |
| 20 | 9.458 | Variable | | |
| 21* | 11.650 | 4.130 | 1.61881 | 63.86 |
| 22 | −7.762 | 0.74 | 1.84666 | 23.78 |
| 23 | −13.694 | Variable | | |
| 24 | ∞ | 2.410 | 1.51633 | 64.14 |
| 25 | ∞ | 2.672 | | |
| Image Surface | ∞ | | | |

TABLE 8

Aspherical Surface Data

16th Surface

K = 0   A4 = −8.48E−05   A6 = −8.63E−08   A8 = −3.89E−09   A10 = 7.69E−12

21nd Surface

K = 0   A4 = −6.72E−05   A6 = −1.20E−06   A8 = 1.20E−07   A10 = −2.86E−09

Various Data
Zoom Ratio 28.27

| | Wide-angle | Intermediate | Telephoto |
|---|---|---|---|
| Focal Length | 3.605 | 37.870 | 101.927 |
| F-number | 1.47 | 3.08 | 3.80 |
| Half Viewing Angle (°) | 34.20 | 3.70 | 1.38 |
| Image Height | 2.45 | 2.45 | 2.45 |
| Overall Length | 88.000 | 88.000 | 88.000 |
| BF | 9.790 | 16.001 | 7.325 |
| d7 | 0.650 | 23.034 | 27.182 |
| d14 | 28.454 | 6.070 | 1.923 |
| d21 | 9.434 | 3.216 | 11.927 |
| d24 | 5.420 | 11.638 | 2.927 |

TABLE 10

Aspherical Surface Data

16th Surface

K = 0   A4 = −8.31E−05   A6 = 3.48E−07   A8 = −2.06E−08   A10 = 1.93E−10

21nd Surface

K = 0   A4 = −1.34E−04   A6 = −1.10E−06   A8 = 8.89E−08   A10 = −2.21E−09

Various Data
Zoom Ratio 28.47

| | Wide-angle | Intermediate | Telephoto |
|---|---|---|---|
| Focal Length | 3.583 | 37.875 | 102.011 |
| F-number | 1.45 | 3.09 | 3.82 |
| Half Viewing Angle (°) | 34.37 | 3.70 | 1.38 |
| Image Height | 2.45 | 2.45 | 2.45 |
| Overall Length | 87.870 | 87.870 | 87.870 |
| BF | 10.299 | 14.600 | 6.051 |
| d7 | 0.650 | 23.494 | 27.521 |
| d14 | 28.793 | 5.948 | 1.921 |
| d21 | 7.405 | 3.092 | 11.670 |
| d24 | 6.068 | 10.381 | 1.803 |

Table 11 below is a correspondence table of the Numerical Embodiments 1 through 5 and the Conditional Expressions 1 through 5. Each numerical value shows a value defined in each of the Conditional Expressions 1 through 5. As such, all of the Numerical Embodiments 1 through 5 satisfy Conditional Expressions 1 through 5.

TABLE 11

| Conditional Expression | Numerical Embodiment 1 | Numerical Embodiment 2 | Numerical Embodiment 3 | Numerical Embodiment 4 | Numerical Embodiment 5 |
|---|---|---|---|---|---|
| 1 | 0.059 | 0.053 | 0.065 | 0.055 | 0.061 |
| 2 | 6.463 | 6.777 | 6.059 | 6.954 | 6.252 |
| 3 | 0.234 | 0.202 | 0.265 | 0.229 | 0.292 |
| 4 | 0.634 | 0.700 | 0.550 | 0.662 | 0.552 |
| 5 | 0.133 | 0.134 | 0.128 | 0.151 | 0.122 |

According to one or more exemplary embodiments, it is possible to achieve miniaturization and about 30 times variable magnification in a positive-negative-positive-positive four group zoom lens system.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A zoom lens system comprising, sequentially from an object side to an image side:
   a first lens group having positive refractive power;
   a second lens group having negative refractive power;
   a third lens group having positive refractive power; and
   a fourth lens group having positive refractive power,
   wherein the first lens group comprises one negative lens, the second lens group comprises one positive lens, the third lens group comprises a positive lens, the fourth lens group comprises at least one positive lens, and a first condition, $0.03 < |f_2/f_t| < 0.08$, is satisfied,
   wherein $f_2$ denotes a focal length of the second lens group and $f_t$ denotes a focal length of the zoom lens system in a telephoto position,
   wherein the first lens group comprises the one negative lens and three first group positive lenses sequentially from the object side to the image side, the second lens group comprises at least three second group negative lenses and the one positive lens, the third lens group comprises the positive lens and a third group cemented lens comprising a third group positive lens and a third group negative lens sequentially provided from the object side to the image side, the fourth lens group comprises the at least one positive lens and at least one negative lens, and
   wherein a zoom ratio of the zoom lens system is greater than 28.

2. The zoom lens system of claim 1, wherein the first and third lens groups are fixed in an optical axis direction, the second lens group is configured to move from the object side to the image side, and the fourth lens group is configured to move in the optical axis direction to compensate for the movement of the second lens group during variable magnification from a wide-angle position to the telephoto position.

3. The zoom lens system of claim 2, wherein the third lens group compensates for off-axis aberration generated during the variable magnification by including at least one surface having an aspherical surface shape.

4. The zoom lens system of claim 3, wherein the fourth lens group compensates for axial aberration generated during the variable magnification by including a cemented lens of a fourth positive lens and a fourth negative lens.

5. The zoom lens system of claim 1, wherein a second condition $5.8 < |f_1/f_2| < 8.0$, is satisfied,
   wherein $f_1$ denotes a focal length of the first lens group and $f_2$ denotes the focal length of the second lens group.

6. The zoom lens system of claim 5, wherein the fourth lens group comprises a fourth group cemented lens of a fourth group positive lens and a fourth group negative lens sequentially from the object side to the image side, the fourth group positive lens comprises at least one surface having an aspherical surface, and another condition, $0.08 < |f_4/f_t| < 0.25$, is satisfied,
   wherein $f_4$ denotes a focal length of the fourth lens group and $f_t$ denotes the focal length of the zoom lens system in the telephoto position.

7. The zoom lens system of claim 1, wherein the positive lens of the third lens group comprises at least one surface having an aspherical surface, a cemented surface of the third group cemented lens is convex to the object side, and following conditions 0.15<|$f_3/f_t$|<0.35 and 0.4<|$f_{31}/f_3$|<0.8, are satisfied, wherein $f_3$ denotes a focal length of the third lens group, $f_{31}$ denotes a focal length of the positive lens in the third lens group closest to the object side, and $f_t$ denotes the focal length of the zoom lens system in the telephoto position.

8. The zoom lens system of claim 7, wherein at least one of the three first group positive lenses uses a glass material having an Abbe number greater than or equal to 80.

9. The zoom lens system of claim 7, wherein the one positive lens in the second lens group comprises a convex surface facing the object side, and the second lens group comprises, sequentially from the object side to the image side, a first and a second negative lenses and a second group cemented lens of the one positive lens and a third negative lens.

10. The zoom lens system of claim 1, wherein at least one of the three first group positive lenses uses a glass material having an Abbe number greater than or equal to 80.

11. The zoom lens system of claim 1, wherein the one positive lens in the second lens group comprises a convex surface facing the object side, and the second lens group comprises, sequentially from the object side to the image side, a first and a second negative lenses and a second group cemented lens of the one positive lens and a third negative lens.

12. The zoom lens system of claim 1, wherein the fourth lens group comprises a fourth group cemented lens of a fourth group positive lens and a fourth group negative lens sequentially from the object side to the image side, the fourth group positive lens comprises at least one surface having an aspherical surface, and another condition, 0.08<|$f_4/f_t$|<0.25, is satisfied, wherein $f_4$ denotes a focal length of the fourth lens group and $f_t$ denotes the focal length of the zoom lens system in the telephoto position.

13. The zoom lens system of claim 1, wherein the fourth lens group comprises a fourth group cemented lens of a fourth group positive lens and a fourth group negative lens sequentially from the object side to the image side, the fourth group positive lens comprises at least one surface having an aspherical surface, and another condition, 0.08<|$f_4/f_t$|<0.25, is satisfied, wherein $f_4$ denotes a focal length of the fourth lens group and $f_t$ denotes the focal length of the zoom lens system in the telephoto position.

14. The zoom lens system of claim 1 further comprising an aperture fixed to an image plane disposed between the second lens group and the third lens group.

15. A photographing apparatus comprising the zoom lens system of claim 1.

16. The zoom lens system of claim 1, wherein each of at least two of the three first group positive lenses uses a glass material having an Abbe number greater than or equal to 80.

17. A zoom lens system comprising, sequentially from an object side to an image side:
a first lens group having positive refractive power;
a second lens group having negative refractive power;
a third lens group having positive refractive power; and
a fourth lens group having positive refractive power,
wherein the first lens group comprises one negative lens, the second lens group comprises one positive lens, the third lens group comprises a positive lens, the fourth lens group comprises at least one positive lens, and a first condition, 0.03<|$f_2/f_t$|<0.08, is satisfied,
wherein $f_2$ denotes a focal length of the second lens group and $f_t$ denotes a focal length of the zoom lens system in a telephoto position, and
wherein the one positive lens in the second lens group comprises a convex surface facing the object side, and the second lens group comprises, sequentially from the object side to the image side, first and second negative lenses and a second group cemented lens of the one positive lens and a third negative lens, and
wherein a zoom ratio of the zoom lens system is greater than 28.

18. The zoom lens system of claim 17, wherein the first lens group comprises the one negative lens and three first group positive lenses sequentially from the object side to the image side, and
wherein each of at least two of the three first group positive lenses uses a glass material having an Abbe number greater than or equal to 80.

* * * * *